(12) United States Patent
Trajkovic et al.

(10) Patent No.: US 7,369,680 B2
(45) Date of Patent: May 6, 2008

(54) METHOD AND APPARATUS FOR DETECTING AN EVENT BASED ON PATTERNS OF BEHAVIOR

(75) Inventors: Miroslav Trajkovic, Ossining, NY (US); Mi-Suen Lee, Ossining, NY (US); Serhan Dagtas, Little Rock, AR (US); Srinivas Gutta, Yorktown Heights, NY (US); Tomas Brodsky, Croton on Hudson, NY (US); Vasanth Philomin, Hopewell Junction, NY (US); Yun-Ting Lin, Ossining, NY (US); Hugo Strubbe, Yorktown Heights, NY (US)

(73) Assignee: Koninklijke Phhilips Electronics N.V., Eindhoven (NL)

( * ) Notice: Subject to any disclaimer, the term of this patent is extended or adjusted under 35 U.S.C. 154(b) by 741 days.

(21) Appl. No.: 10/184,511

(22) Filed: Jun. 28, 2002

(65) Prior Publication Data

US 2003/0058339 A1    Mar. 27, 2003

Related U.S. Application Data

(60) Provisional application No. 60/325,399, filed on Sep. 27, 2001.

(51) Int. Cl.
*G06K 9/00* (2006.01)
(52) U.S. Cl. .................. 382/103; 348/155; 348/169; 340/540
(58) Field of Classification Search ............. 348/155, 348/169; 382/103, 181; 340/573.1
See application file for complete search history.

(56) References Cited

U.S. PATENT DOCUMENTS

| | | | | |
|---|---|---|---|---|
| 4,839,631 A | * | 6/1989 | Tsuji ...................... 340/541 |
| 5,107,845 A | * | 4/1992 | Guern et al. ............... 600/473 |
| 5,689,241 A | * | 11/1997 | Clarke et al. .............. 340/575 |
| 5,917,936 A | * | 6/1999 | Katto ....................... 382/154 |
| 6,002,994 A | * | 12/1999 | Lane et al. ................ 702/188 |
| 6,049,281 A | * | 4/2000 | Osterweil ................. 340/573.4 |
| 6,263,260 B1 | | 7/2001 | Bodmer et al. ............ 700/275 |
| 6,611,206 B2 | * | 8/2003 | Eshelman et al. ......... 340/573.1 |
| 6,614,348 B2 | * | 9/2003 | Ciccolo et al. ............ 340/541 |
| 6,678,413 B1 | * | 1/2004 | Liang et al. ............... 382/181 |
| 6,807,298 B1 | * | 10/2004 | Park et al. ................ 382/165 |
| 6,825,884 B1 | * | 11/2004 | Horiuchi .................. 348/362 |
| 6,927,694 B1 | * | 8/2005 | Smith et al. .............. 340/576 |
| 6,980,679 B2 | * | 12/2005 | Jeung et al. .............. 382/128 |
| 6,995,664 B1 | * | 2/2006 | Darling .................... 340/505 |
| 2003/0058111 A1 | * | 3/2003 | Lee et al. ................. 340/573.1 |

FOREIGN PATENT DOCUMENTS

EP        0567059 A1    10/1993

OTHER PUBLICATIONS

Ogawa, Mitsushiro. "Long term remote behavioral monitoring of elderly by using sensors installed in ordinary houses", 2nd Annual International IEEE-EMBS Special Topic Conference on Microtechnologies in Medicine & Biology, May 2-4, 2002.*
Ogawa, Mitsuhiro. "An attempt of monitoring daily activities at home", Proceedings of the 22nd Annual EMBS International Conference, Jul. 23-28, 2000.*
Warakagoda, "Definition of Hidden Markov Model", http://jedlik.phy.bme.hu/~gerjanos/HMM/node4.html, 1996.*
Lee et al.; "An HMM-Based Threshold Model Approach for Gesture Recoginition", IEEE Transactions on Patern Analysis and Machine Intelligence, vol. 21 No. 10, Oct. 1999.*
Hosie et al., "Classifying and Detecting Group Behavior From Visual Surveillance Data," Curtin University of Technology, (1998).
Koller-Meier et al., "Modeling and Recognition of Human Actions Using a Stochastic Approach," Swiss Federal Institute of Technology, (2001).
Moeslund et al., "A Survey of Computer Vision-Based Human Motion Capture," Aalborg University, (2001).
Nakazawa et al., "Human Tracking Using Distributed Vision Systems," Graduate School of Engineering Science, (1998).

* cited by examiner

*Primary Examiner*—Bhavesh M. Mehta
*Assistant Examiner*—John B Strege

(57) ABSTRACT

A system and apparatus are disclosed for modeling patterns of behavior of humans or other animate objects and detecting a violation of a repetitive pattern of behavior. The behavior of one or more persons is observed over time and features of the behavior are recorded in a multi-dimensional space. Over time, the multi-dimensional data provides an indication of patterns of human behavior. Activities that are repetitive in terms of time, location and activity, such as sleeping and eating, would appear as a Gaussian distribution or cluster in the multi-dimensional data. Probability distribution functions can be analyzed using known Gaussian or clustering techniques to identify repetitive patterns of behavior and characteristics thereof, such as a mean and variance. Deviations from repetitive patterns of behavior can be detected and an alarm can be triggered, if appropriate.

22 Claims, 5 Drawing Sheets

METHOD AND APPARATUS FOR DETECTING AN EVENT BASED ON PATTERNS OF BEHAVIOR

CROSS REFERENCE TO RELATED APPLICATIONS

This application claims the benefit of U.S. Provisional Application No. 60/325,399, filed Sep. 27, 2001. This application is related to United States Patent Application entitled "Method and Apparatus for Modeling Behavior Using a Probability Distribution Function," filed contemporaneously herewith.

FIELD OF THE INVENTION

The present invention relates to computer vision systems, and more particularly, to behavior modeling and detection methods and systems that identify events by observing patterns of behavior.

BACKGROUND OF THE INVENTION

Computer vision techniques are increasingly used to automatically detect or classify objects or events in images. For example, behavior modeling techniques are often applied to identify human behavior patterns. Typically, behavior analysis and modeling systems initially learn the patterns of behavior and thereafter detect deviations from such patterns of behavior. Generally, conventional behavior analysis techniques are focused on the detection of unusual events.

Most prior work in behavior modeling has been concerned with the modeling of trajectories either as probability distributions or Hidden Markov Models (HMMs). Once the trajectories are modeled, the goal is to predict the trajectory of the objects and to detect "unusual" trajectories. For example, trajectory analysis techniques have been applied to observe the trajectories of persons walking in a particular area and to thereafter generate an alarm if a trajectory indicates that a person has entered a restricted area.

While conventional trajectory analysis techniques perform well for many security applications, the validity and value of such trajectory analysis techniques for other applications, such as home monitoring, is questionable. In particular, when a behavior modeling system is monitoring the activities of one or more particular people, such as the remote monitoring of an elderly person in a home environment, the most relevant information is the current location or activity of the person, as opposed to how the person arrived at his or her current position or activity.

A need therefore exists for behavior modeling and detection methods and systems that identify an event by observing patterns of behavior and detecting a violation of a repetitive pattern of behavior.

SUMMARY OF THE INVENTION

Generally, a method and apparatus are disclosed for automatically learning and identifying patterns of behavior in image data. According to one aspect of the invention, a method and apparatus are provided for modeling patterns of behavior of humans or other animate objects and detecting a violation of a repetitive pattern of behavior. The present invention observes behavior of one or more persons over time and records features of the behavior in a multi-dimensional space. For example, the user behavior can be obtained for a multi-dimensional space that includes location (e.g., vertical and horizontal position), time, body posture and a level of body motion. Over time, the multi-dimensional data provides an indication of patterns of human behavior. Activities that are repetitive in terms of time, location and activity, such as sleeping and eating, would appear as a Gaussian distribution or cluster in the multi-dimensional data.

A learning algorithm is applied to the multi-dimensional data to identify repetitive patterns of behavior. In one exemplary embodiment, a probability density function (pdf) is computed from the multi-dimensional feature data to model human behavior. The probability distribution function can be analyzed using any method for PDF analysis, such as Gaussian or clustering techniques, to identify repetitive patterns of behavior and characteristics thereof. Generally, repetitive patterns of behavior will be manifested in the multi-dimensional feature data as a Gaussian distribution or as a cluster, each characterized by a mean and variance.

The probability distribution function can be clustered into distinct clusters, and clusters can be associated to patterns of behavior. Generally, clusters do not need to be labeled with the corresponding action, such as eating. It is sufficient to know that the cluster is associated with some distinct behavior.

According to another aspect of the invention, deviations from repetitive patterns of behavior can be detected and an alarm can be triggered, if appropriate. For example, when repetitive patterns of behavior are expressed as Gaussian distributions or clusters, the variance provides a threshold for determining whether current behavior should be classified as a deviation from a repetitive pattern of behavior. Generally, unusual behavior can indicate some kind of health problem or emergency. Thus, rules can optionally be established to generate an alarm when a deviation from a repetitive pattern of behavior satisfies one or more predefined conditions.

A more complete understanding of the present invention, as well as further features and advantages of the present invention, will be obtained by reference to the following detailed description and drawings.

DETAILED DESCRIPTION

Figure 1:
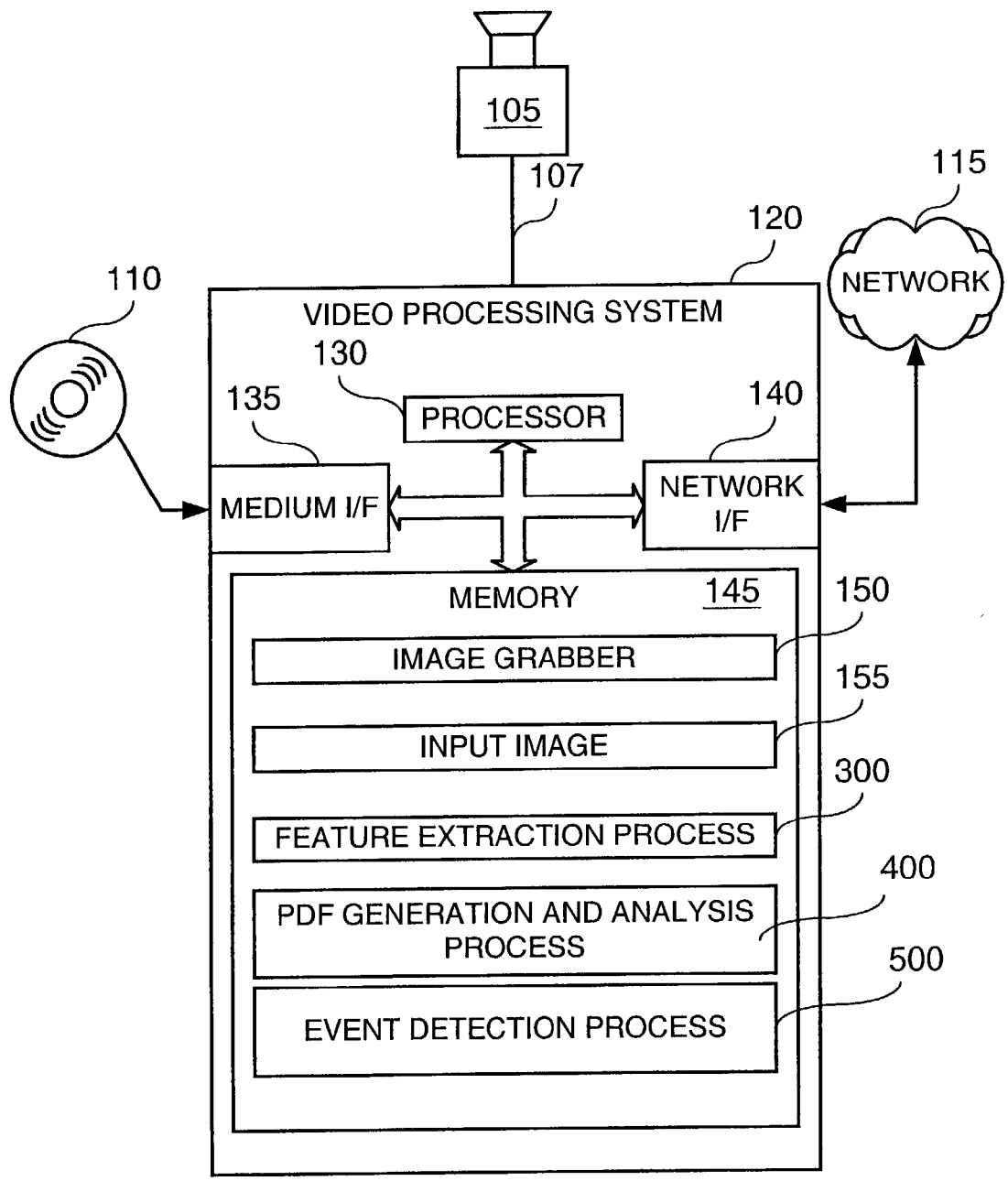
FIG. 1 illustrates an exemplary video monitoring system in accordance with a preferred embodiment of the invention.

FIG. 1 illustrates an exemplary video monitoring system 120 in accordance with the present invention. The video monitoring system 120 models patterns of behavior of humans or other animate objects and detects a violation of a repetitive pattern of behavior. For example, the video monitoring system video monitoring system 120 may monitor the sleeping and eating patterns of a human being observed. Thereafter, deviations from such patterns of behavior, such as sleeping for unusual intervals or at unusual times, or eating unusual amounts or at irregular intervals, can be detected to trigger an alarm, if appropriate.

In one exemplary embodiment, discussed further below, the present invention observes behavior of one or more persons over time and records features of the behavior in a multi-dimensional space. For example, the user behavior can be obtained for a five-dimensional space that includes two dimensions for location (vertical and horizontal), time, body posture and a level of body motion. Over time, the multi-dimensional data provides an indication of patterns of human behavior. Activities that are repetitive in terms of time, location and activity, such as sleeping and eating, would appear as clusters in the multi-dimensional data.

Thereafter, a learning algorithm is applied to the multi-dimensional data to identify such repetitive patterns of behavior. For example, a probability density function (pdf) can be computed for modeling the person's behavior. The probability distribution function can be analyzed using Gaussian or clustering techniques to identify repetitive patterns of behavior and characteristics thereof. Generally, repetitive patterns of behavior will be identified in the multi-dimensional data as a Gaussian distribution or as a cluster, each characterized by a mean and variance.

Once repetitive patterns of behavior have been identified, deviations from such repetitive events or behavior can be detected to trigger an alarm, if appropriate. For example, when repetitive patterns of behavior are expressed as a Gaussian distribution or as a cluster, the variance of the Gaussian distribution or cluster provides a threshold for determining whether current behavior should be classified as part of a repetitive pattern of behavior or as a deviation from a repetitive pattern of behavior.

Generally, unusual behavior can indicate some kind of health problem or emergency. Thus, rules can be established for generating an alarm when behavior is detected that is a deviation from a repetitive pattern of behavior.

The probability distribution function can be clustered into distinct clusters, and clusters can be associated to patterns of behavior. Generally, clusters do not need to be labeled with the corresponding action, such as eating. It is sufficient to know that the cluster is associated with some distinct behavior. Thus, a knowledge-based description can optionally be provided of certain behaviors to recognize such behaviors from the probability distribution function. For example, since people usually sleep at night, a cluster with a pre-specified time (e.g., several hours during the night), posture (e.g., lying down) and activity (e.g., low level of body motion) can be labeled as sleeping. Moreover, from this description the location of the person's bed in the house can be inferred.

Referring now to FIG. 1, a video processing system 120 is shown that observes behavior and detects patterns of behavior in accordance with the present invention. Video processing system 120 is shown interoperating with one or more cameras, such as camera 105, through video feed 107, a Digital Versatile Disk (DVD) 110 and a network 115. Video processing system 120 comprises a processor 130, a medium interface 135, a network interface 140, and a memory 145. Memory 145 comprises image grabber 150, an input image 155, a feature extraction process 300, discussed below in conjunction with FIG. 3, a PDF generation and analysis process 400, discussed below in conjunction with FIG. 4, and an event detection process 500, discussed below in conjunction with FIG. 5.

As is known in the art, the methods and apparatus discussed herein may be distributed as an article of manufacture that itself comprises a computer-readable medium having computer-readable code means embodied thereon. The computer-readable program code means is operable, in conjunction with a computer system such as video processing system 120, to carry out all or some of the steps to perform the methods or create the apparatuses discussed herein. The computer-readable medium may be a recordable medium (e.g., floppy disks, hard drives, compact disks such as DVD 110 accessed through medium interface 135, or memory cards) or may be a transmission medium (e.g., a network 115 comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk, such as DVD 110.

Memory 145 will configure the processor 130 to implement the methods, steps, and functions disclosed herein. The memory 145 could be distributed or local and the processor 130 could be distributed or singular. The memory 145 could be implemented as an electrical, magnetic or optical memory, or any combination of these or other types of storage devices. The term "memory" should be construed broadly enough to encompass any information able to be read from or written to an address in the addressable space accessed by processor 130. With this definition, information on a network, such as network 115 accessed through network interface 140, is still within memory 145 of the video processing system 120 because the processor 130 can retrieve the information from the network. It should also be noted that all or portions of video processing system 120 may be made into an integrated circuit or other similar device, such as a programmable logic circuit.

Now that a system has been discussed, probability models will be discussed that can provide global and local pixel dependencies and incremental training.

Figure 2:
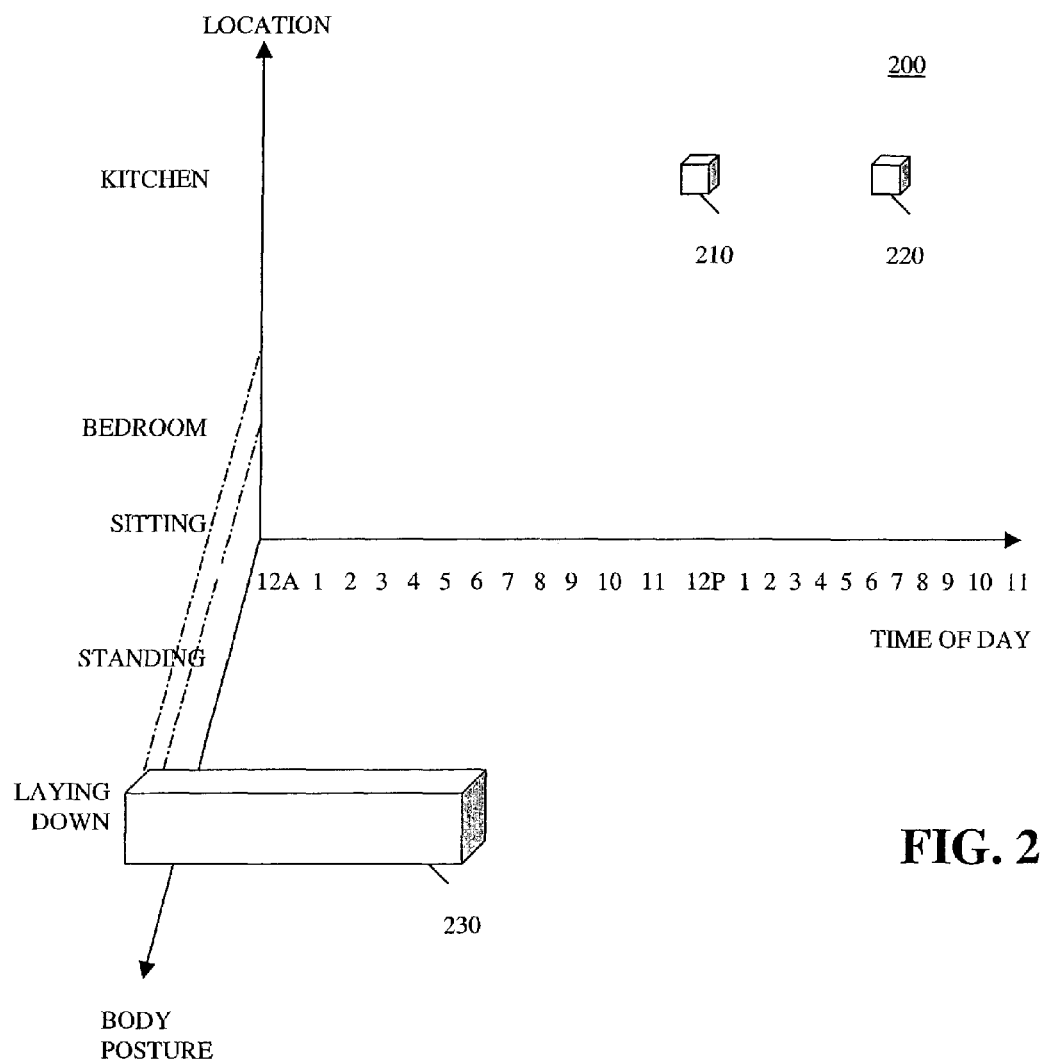
FIG. 2 illustrates a plot of human behavior observed in a multi-dimensional space in accordance with the present invention.

FIG. 2 illustrates a plot 200 of human behavior observed in a multi-dimensional space. In the exemplary embodiment of FIG. 2, human behavior is monitored based on time of day, body posture and location (in a home). The exemplary time of day dimension is continuous while the exemplary body posture (e.g., sitting, standing and laying down) and location dimensions are discrete. In addition, for illustration purposes, the exemplary location dimension has been translated from raw horizontal and vertical coordinates in a home to an indication of a particular room in the home (kitchen and bedroom). It is noted that the exemplary behavior plot 200 does not indicate a level of body motion.

The data indicated in FIG. 2 has been filtered for illustration purposes to remove random behavior and to otherwise remove behavior that does not constitute a pattern of behavior. The remaining data in FIG. 2 includes three clusters 210, 220, 230 that are each associated with a pattern of behavior. The cluster 210 indicates that the person is located in the kitchen, in a sitting position, around noon, and suggests that the person is having lunch. The cluster 220 indicates that the person is located in the kitchen, in a sitting position, around 6 p.m., and suggests that the person is having dinner. The cluster 230 indicates that the person is located in the bedroom, in a laying down position, during the time period from midnight to 7 a.m., and suggests that the person is sleeping.

Figure 3:
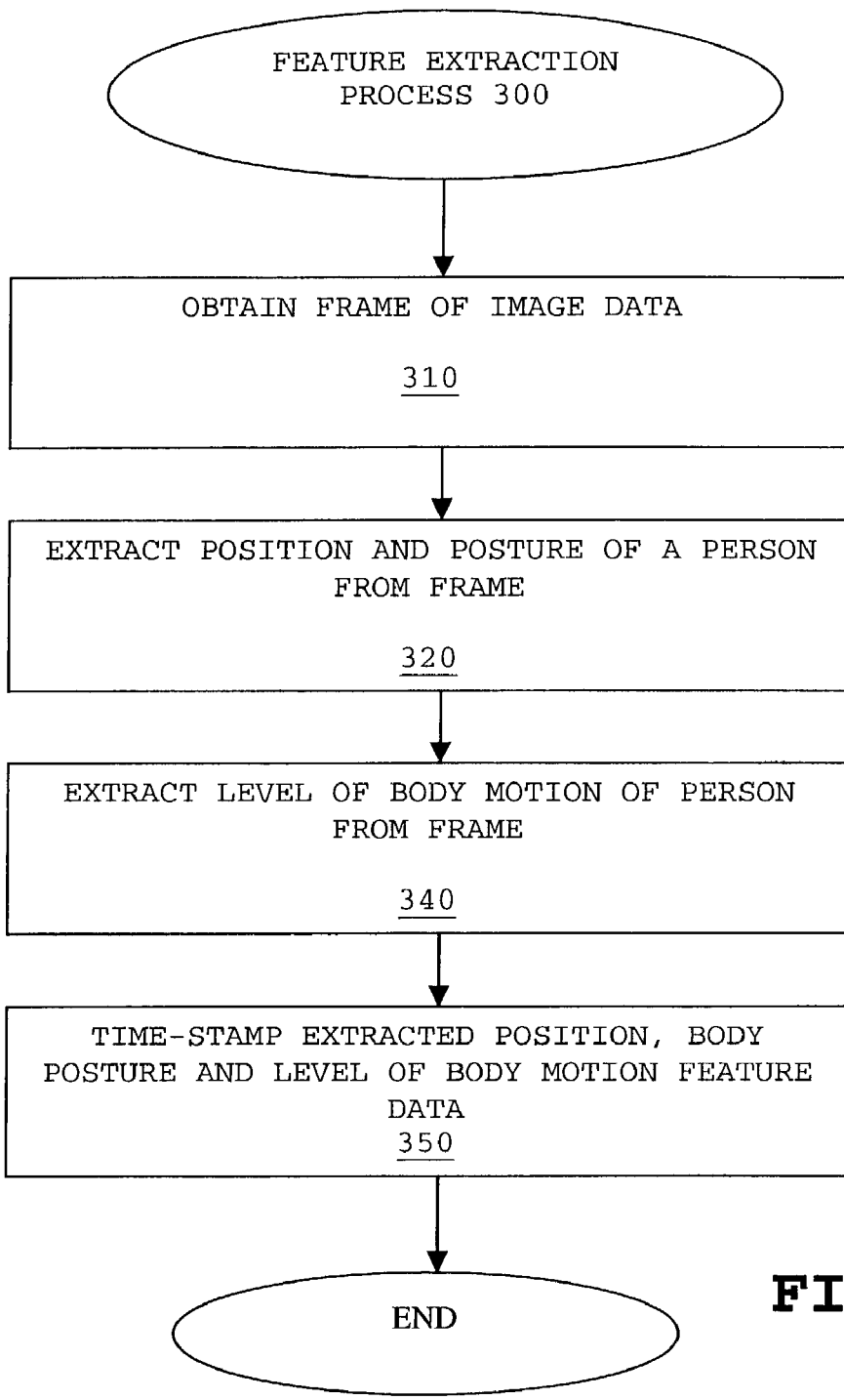
FIG. 3 is a flow chart describing an exemplary implementation of the feature extraction process of FIG. 1.

FIG. 3 is a flow chart describing an exemplary feature extraction process 300 that is used to observe the person's behavior that is used to generate the exemplary behavior plot 200 shown in FIG. 2. Initially, the feature extraction process 300 obtains a frame of image data during step 310. Thereafter, the feature extraction process 300 extracts the position and posture of a person from the frame during step 320, e.g., using well-known tracking and posture analysis techniques, such as those described in S. Iwasawa et al., "Real-Time Human Posture Estimation Using Monocular Thermal Images," Proc. of the 3rd Int'l Conf. on Automatic Face and Gesture Recognition, 492-497, Nara, Japan (Apr. 14-16, 1998).

The level of body motion can optionally be obtained during step 340, for example, using optical flow, motion history, or other motion estimation techniques. Suitable optical flow estimation techniques are described, for example, in J. L. Barron et al., "Performance of Optical Flow Techniques," Int'l J. of Computer Vision, 12(1):43-77 (1994). The level of body motion is generally the amount of motion a person is producing while remaining in the vicinity of the same physical location.

The extracted position, body posture and level of body motion feature data can be time-stamped during step 350, so that the data can be plotted as a function of time of day, as shown in FIG. 2. Thereafter, program control terminates.

Figure 4:
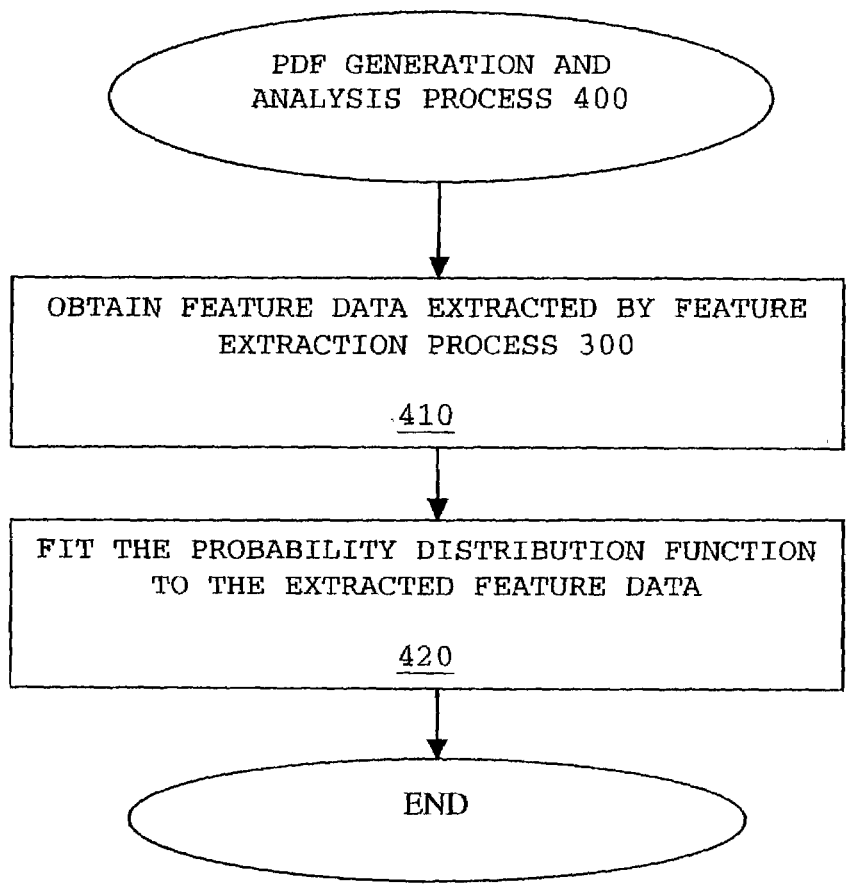
FIG. 4 is a flow chart describing an exemplary implementation of the PDF generation and analysis process of FIG. 1.

FIG. 4 is a flow chart describing an exemplary PDF generation and analysis process 400 that processes the feature data obtained by the feature extraction process 300 (FIG. 3) and generates and analyzes a probability distribution function in the exemplary embodiment to identify repetitive patterns of behavior and characteristics thereof. As shown in FIG. 4, the PDF generation and analysis process 400 initially obtains the feature data extracted by the feature extraction process 300 during step 410 in the desired multi-dimensional space.

Thereafter, the probability distribution function is fit to the extracted feature data during step 420. For a discussion of a suitable technique for fitting the mixture of Gaussians to the extracted feature data, see, for example, H. G. C. Traven, "A Neural Network Approach to Statistical Pattern Classification by 'Semiparametric' Estimation of Probability Density Functions," IEEE Trans. on Neural Networks, 2, 366-377 (1991). Thereafter, program control terminates.

As previously indicated, repetitive patterns of behavior will be manifested in the multi-dimensional data as a Gaussian distribution or cluster, each characterized by a mean and variance. In the exemplary embodiment, the probability distribution function is a mixture of Gaussians, given in the form:

$$f(x) = \sum_{j=1}^{n} \exp\left(-\frac{1}{2}(x - \mu_j)^T C_j^{-1}(x - \mu_j)\right) \quad \text{Eq. (1)}$$

where x denotes a point in the multidimensional space, n denotes the number of Gaussians (unknown), and $\mu_j$ and $C_j$ denote the mean and covariance, respectively, of the $j^{th}$ Gaussian (also unknown).

Figure 5:
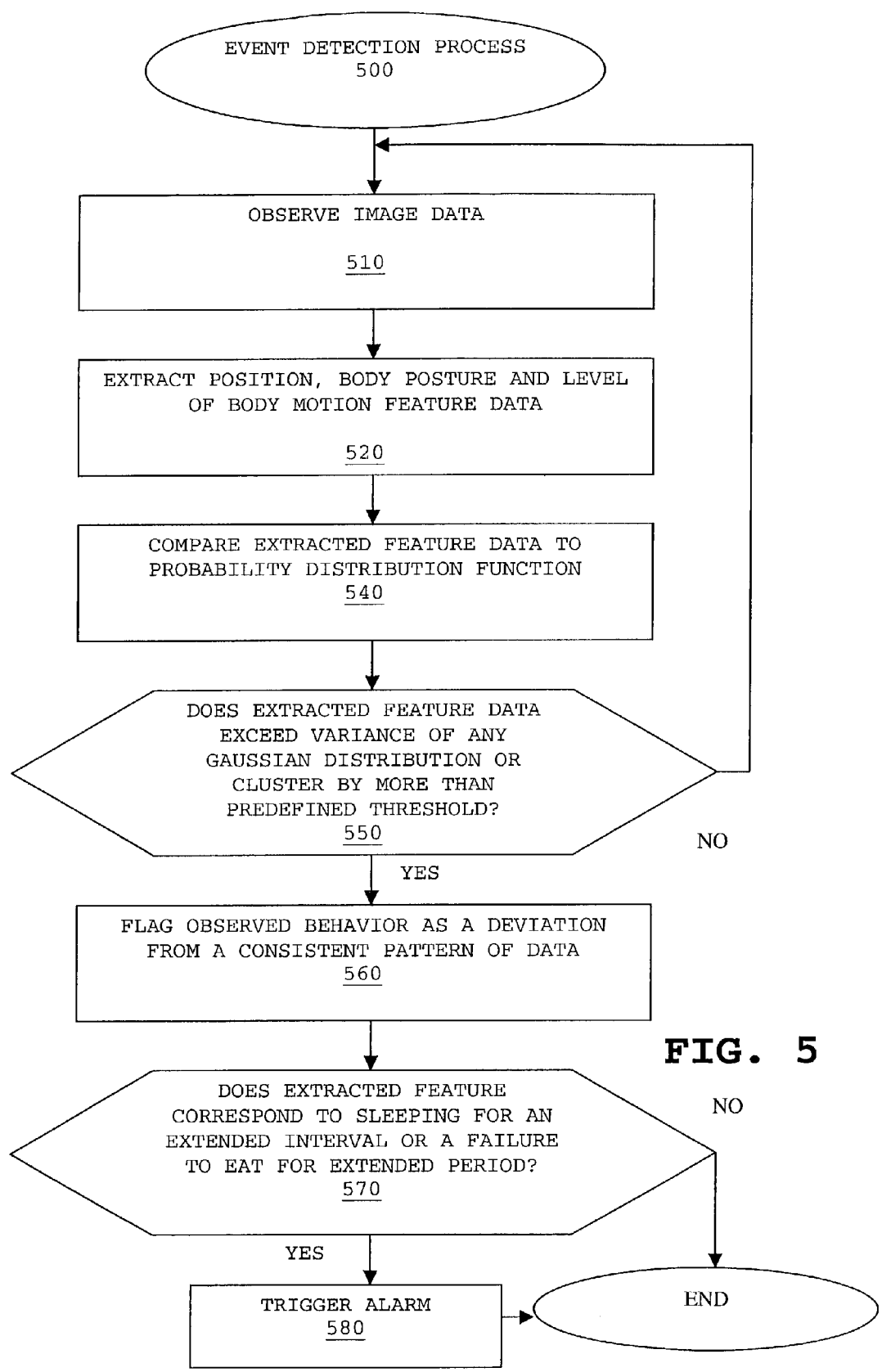
FIG. 5 is a flow chart describing an exemplary implementation of the event detection process of FIG. 1.

FIG. 5 is a flow chart describing an exemplary event detection process 500 that detects deviations from repetitive patterns of behavior. For example, when repetitive patterns of behavior are expressed as a Gaussian distribution or as a cluster, the variance of the Gaussian distribution or cluster provides a threshold for determining whether current behavior should be classified as part of a repetitive pattern of behavior or as a deviation from a repetitive pattern of behavior. The exemplary event detection process 500 employs a number of rules to generate an alarm when behavior is detected that is a deviation from a repetitive pattern of behavior.

As shown in FIG. 5, the event detection process 500 initially observes the image data during step 510. Thereafter, the event detection process 500 extracts a number of features during step 520, such as position, body posture and level of body motion feature data. The extracted feature data is then compared during step 540 to the probability distribution function generated by the PDF generation and analysis process 400.

A test is performed during step 550 to determine if the extracted feature data exceed the variance of any Gaussian distribution or cluster by more than a predefined threshold. It is noted that the threshold is generally based on the variance of each Gaussian distribution or cluster (e.g., variance plus some tolerance). If it is determined during step 550 that the extracted feature data does not exceed the variance of any Gaussian distribution or cluster by more than a predefined threshold, then program control returns to step 510 to continue monitoring human behavior for further deviations.

If, however, it is determined during step 550 that the extracted feature data does exceed the variance of any Gaussian distribution or cluster by more than a predefined threshold, then the observed behavior is likely a deviation from a repetitive pattern of data. Data indicative of random behavior can be filtered out, for example, using a Kullback-Leibler distance technique or an intersection, discussed below in conjunction with equations 2 and 3, respectively.

The observed behavior is flagged as a deviation from a repetitive pattern of data during step 560. In addition, the observed behavior is evaluated during step 570 to determine if it violates a number of exemplary predefined rules that have been established to generate an alarm when certain behavior is detected that is a deviation from a repetitive pattern of behavior. If it is determined during step 570 that one or more of the exemplary predefined rules are violated then an alarm is generated during step 580 before program control terminates.

It is noted that the exemplary event detection process 500 described above decomposes the probability distribution function (Eq. 1) characterizing patterns of behavior into n single Gaussians, and newly detected behavior, b(x), is compared against each of the Gaussians separately. Generally, when new behavior is detected, the event detection process 500 measures how far new behavior is from the probability distribution function, f(x) from Eq. 1, and there are number of ways to do that. One way is to compute the overlap between the normal behavior, f(x), and the newly detected behavior, b(x). This can be done using, for instance, Kullback-Leibler distance:

$$d_{KL}(f, b) = \int f(x) \log \frac{f(x)}{b(x)} dx \quad (2)$$

where integration is performed over the entire space. Equation (2) is merely a more compact expression of the technique implemented by the exemplary event detection process 500 of FIG. 5.

Another distance function that can be used is simple intersection defined as:

$$d_{int}(f,b) = \int \min(f(x), b(x)) dx. \quad (3)$$

It is note that if $0 \leq d_{int} \leq 1$. If b=f then $d_{int}=1$, and if b∩f=0 $d_{int}=0$. If b is uniformly distributed random signal, then $d_{int} \approx 0$.

In a further variation, patterns of behavior can be identified by clustering the data, which is effectively the same technique as fitting a mixture of Gaussians, discussed above in conjunction with FIG. 4. The difference is that an analytical function is not estimated, but the optimal way to group data into clusters is determined. These clusters may not be represented in analytical, but only in relational form (i.e., we could say certain set of points belong to one cluster and some other set of points belong to another cluster). Whenever a new behavior is detected, we would check whether it fits some of our clusters (usual behavior), or it should be a distinct cluster (unusual behavior). Then, the cluster size would determine how "normal" behavior is (the bigger the size, the more normal the behavior). Any clustering technique may be employed. Some of the more popular clustering techniques are described, for example, in Richard Duda et al., "Pattern Classification," Ch. 10, Willey (2001).

It is to be understood that the embodiments and variations shown and described herein are merely illustrative of the principles of this invention and that various modifications may be implemented by those skilled in the art without departing from the scope and spirit of the invention.

What is claimed is:

1. A method for detecting an event based on behavior of a person, said method comprising:
   visually observing a plurality of behaviors of the person in a five dimensional space that includes vertical distance, horizontal distance, time, body posture and magnitude of body motion;
   obtaining a plurality of images;
   identifying at least one pattern of behavior from the visual observation of the plurality of behaviors;
   recognizing the at least one pattern of behavior in said plurality of images by fitting a probability distribution function to said plurality of images; and
   detecting an absence of said pattern of behavior.

2. The method of claim 1, wherein said detecting further comprises generating an alarm.

3. The method of claim 1, wherein said fitting identifies at least one Gaussian having a mean and variance.

4. The method of claim 3, wherein said detecting further comprises determining if features extracted from said plurality of images exceed a predefined threshold distance based upon said variance of a Gaussian.

5. The method of claim 1, wherein said recognizing further comprises clustering said plurality of images to identify said at least one repetitive pattern of behavior.

6. The method of claim 5, wherein said clustering step further comprises computing a mean and variance of said clustered images.

7. The method of claim 6, wherein said detecting further comprises determining if features extracted from said plurality of images exceed a predefined threshold distance based upon said variance of a cluster.

8. The method of claim 6, wherein said detecting further comprises evaluating a distance between said features extracted from said plurality of images and one of said clustered images.

9. The method of claim 1, further comprising extracting a plurality of features from said plurality of images.

10. The method of claim 9, further comprising expressing said plurality of extracted features as a probability distribution function.

11. The method of claim 9, further comprising expressing said plurality of extracted features in said five dimensional space.

12. A system for detecting an event based on behavior of a person, said system comprising:
    a memory that stores computer-readable code; and
    a processor operatively coupled to said memory, said processor configured to implement said computer-readable code, said computer-readable code configured to:
    visually observe a plurality of behaviors of the person in a five dimensional space that includes vertical distance, horizontal distance, time, body posture and magnitude of body motion;
    obtaining a plurality of images;
    identify at least one pattern of behavior from the visual observation of the plurality of behaviors;
    recognize the at least one pattern of behavior in said plurality of images by fitting a probability distribution function to said plurality of images; and
    detect an absence of said pattern of behavior.

13. The system of claim 12, wherein said processor is further configured to generate an alarm.

14. The system of claim 12, wherein said processor is further configured to identify at least one Gaussian having a mean and variance.

15. The system of claim 14, wherein said processor is further configured to determine if features extracted from said plurality of images exceed a predefined threshold distance based upon said variance of a Gaussian.

16. The system of claim 12, wherein said processor is further configured to cluster said plurality of images to identify said at least one repetitive pattern of behavior.

17. The system of claim 16, wherein said processor is further configured to compute a mean and variance of said clustered images.

18. The system of claim 17, wherein said processor is further configured to determine if features extracted from said plurality of images exceed a predefined threshold distance based upon said variance of a cluster.

19. The system of claim 17, wherein said processor is further configured to evaluate a distance between said features extracted from said plurality of images and one of said clustered images.

20. The system of claim 12, wherein said processor is further configured to extract a plurality of features from said plurality of images.

21. The system of claim 20, wherein said processor is further configured to express said plurality of extracted features as a probability distribution function.

22. An article of manufacture for detecting an event based on behavior of a person, said article of manufacture comprising:
    a computer-readable medium having stored thereon computer-readable code to:
    visually observe a plurality of behaviors of the person in a five dimensional space that includes vertical distance, horizontal distance, time, body posture and magnitude of body motion;
    obtaining a plurality of images;
    identify at least one pattern of behavior from the visual observation of the plurality of behaviors;
    recognize the at least one pattern of behavior in said plurality of images by fitting a probability distribution function to said plurality of images to identify at least one Gaussian having a mean and variance; and
    detect an absence of said pattern of behavior.

* * * * *